United States Patent [19]
Materick

[11] 3,806,288
[45] Apr. 23, 1974

[54] SEGMENTAL TIRE CURING MOULD
[75] Inventor: Dennis A. Materick, Brantford, Ontario, Canada
[73] Assignee: Aeco Metals Limited, Brantford, Ontario, Canada
[22] Filed: Dec. 1, 1972
[21] Appl. No.: 311,321

[30] Foreign Application Priority Data
Sept. 15, 1972 Canada .............................. 151776

[52] U.S. Cl. .................. 425/47, 425/46, 425/39
[51] Int. Cl. ..................... B29h 5/02, B29b 5/08
[58] Field of Search .............. 425/39, 46, 47, 36

[56] References Cited
UNITED STATES PATENTS
| 3,337,918 | 8/1967 | Pacciarini et al. | 425/39 |
|---|---|---|---|
| 3,464,090 | 9/1969 | Cantarutti | 425/46 X |
| 3,553,789 | 1/1971 | Allitt | 425/36 |

FOREIGN PATENTS OR APPLICATIONS
| 1,160,606 | 1/1964 | Germany | 425/47 |
|---|---|---|---|
| 1,590,815 | 4/1970 | France | 425/46 |
| 1,928,829 | 12/1970 | Germany | 425/46 |

*Primary Examiner*—J. Howard Flint, Jr.

[57] ABSTRACT

A segmental mould mechanism for curing a pneumatic tire is described and includes two opposed sidewall moulding sections, a plurality of radially movable tread moulding segments mounted between said sections and means for effecting radially inward and outward movement of the tread moulding segments upon movement of the sidewall mould sections towards and away from one another. The mechanism includes a unique "floating" segment mounting arrangement whereby sliding contact between the segments and the bearing surface on which they are mounted for radially inward and outward movement is minimized. More specifically, the segment mounting arrangement is adapted to permit limited axial movement of the segments away from the bearing surface on which they are mounted under the influence of resilient biasing means interspaced between the adjacent surfaces of the segments and the bearing surface thereby preventing direct contact between these surfaces until the segments are pressed towards the bearing surface with sufficient force to overcome the force of the resilient biasing means. In a preferred form, the segment mounting is also adapted to permit limited pivotal movement of the segments about axes substantially parallel to the axes of sidewall moulding sections. This feature, together with the "floating" quality of the segments, serves to facilitate the release of the mould segments from the tire tread after curing and to minimize binding or jamming of the segments during their inward and outward radial movement.

17 Claims, 5 Drawing Figures

SEGMENTAL TIRE CURING MOULD

This invention relates to a mould mechanism for curing and moulding a tire under heat and pressure and, more particularly, to a mould mechanism of the segmental type which is particularly adapted for moulding and curing radial tires.

BACKGROUND OF THE INVENTION

Various types of moulding and curing presses are known in the art and may conveniently be categorized into two groups, namely those presses utilizing a two-part mould having opposed annular mould halves suitable for shaping and curing passenger size cross-ply tires and those presses utilizing segmental moulds having opposed annular mould sections together with radially movable tread moulding segments generally used for curing radial-ply tires and giant cross-ply tires.

The segmental type of mould has been developed for several reasons, an important one being that, in the curing of radial-ply tires, it is generally not practicable to further expand the tire radially after its location in the mould. A radial-ply tire generally includes two or more circumferential, substantially inextensible belts or breaker layers above the carcass plies and, due to the inextensibility of such breaker layers, it has been necessary in the building of the tire to expand the carcass radially outwardly into contact with the breaker layers and tread rubber so that the green tire assumes a partially shaped configuration before its insertion in the mould. It is thus generally impractical to expand such partially shaped green tire radially outwardly when it is located in the mould and, in any event, the stiffened tread region of a radial-ply tire, when cured, would not release readily from a two-part mould during axial separation of the mould halves; the tendency being to tear rubber during such mould separation and to cause damage to the mould elements.

On the other hand, the segmental mould overcomes the foregoing disadvantages inasmuch as the mould segments are moved radially inwardly to engage the tread region of the green tire rather than expanding the tire radially outwardly to contact the treat mould. Also, after the tire has been cured, the tread moulding segments are withdrawn radially outwardly to free them from the moulded tire without axial movement relative thereto, whereby release of the mould segments is facilitated and likelihood of damage to the tread region of the tire and the tread moulding elements is minimized.

In the known mechanisms provided for effecting movement of the tread moulding segments radially inwardly and outwardly the moulding segments generally are slidably mounted on a bearing or support surface and have guide means, such as tongue and groove configurations, to ensure that the segments are maintained in true radial and axial alignment at all times. As a result, such mounting arrangements are characterized by very close tolerances between relatively moving adjacent surfaces of the segments, the bearing surface and the guide means. This, in turn, results in a number of problems. Firstly, the very close tolerances required add greatly to the manufacturing costs of such segmental mould mechanisms. Secondly, friction between the adjacent sliding surfaces of the mould segments and the mounting mechanism necessitates that these surfaces be formed of hard, wear resistant material. This also increases the manufacturing costs of the moulds and, even with the use of wear resistant surfaces and careful lubrication, wear does occur over a period of time under the severe conditions of commercial tire curing operations.

The known mould mechanisms of the segmental type have the further disadvantage that the means provided for effecting movement of the tread moulding segments inwardly and outwardly generally occupy a substantial amount of space radially outwardly of the overall boundaries of the annular sidewall mould sections. As a result, a mould mechanism of this type designed for curing radial tires within a given size range cannot be directly used in conventional tire curing presses of the type which normally utilize a two-part mould for curing bias-ply tires in the same general size range. In some cases, this type of mould mechanism can be utilized in conventional presses which are designed for curing bias-ply tires much larger in size than the tires for which the segmental mould is designed but this practice is generally wasteful of press capacity and, therefore, is commercially unattractive. As a result, it is generally necessary either to use a special curing press to accommodate the segmental mould or at least to modify existing split mould presses to achieve the same result.

It has recently been proposed, in co-pending United States application Ser. No. 227,231 of the present inventor, to provide a segmental tire mould which is readily adaptable for use in conventional split mould curing presses without resort to modification or use of oversized presses and which may, at the same time, be utilized for the moulding of either cross-ply or radial-ply tires. In accordance with this prior application, such mould includes a pair of opposed mould sections for moulding the sidewalls of a tire and a segmental centre mould section for moulding the tread region of a tire. One of the sections carries the mould segments thereon for radial sliding movement relative thereto and the other mould section is associated with actuating means cooperable with the mould segments for moving them radially inwardly upon closing movement of the moulding sidewall sections towards one another. The mould segments are spring biased radially outwardly with respect to the centre of the mould section upon which they are mounted such that upon opening of the mould sections, the segments are movable radially outwardly of the mould by the biasing means. While the mould construction of this prior application achieves the basic purpose of permitting utilization of conventional, unmodified presses for production of radial-ply tires, the aforementioned problems of friction between relatively moving parts and sticking or binding of the segments during operation are not entirely avoided.

SUMMARY OF THE INVENTION

It is an object of the present invention, therefore, to provide a segmental tire mould mechanism which incorporates a novel segment mounting arrangement which minimizes sliding contact between relatively moving parts and which eliminates the need for extremely close tolerances in the machining and assembly of the various parts.

It is a further object of the invention to provide a segment mounting arrangement which eliminates, or at least substantially decreases, the tendency for the segments to bind or jam during radial movement between their open or tire loading position and their closed or tire moulding position.

Another object of the invention is to provide a segmental mould mechanism which is readily adaptable for use in conventional curing presses which normally utilize upper and lower mould halves, each of which includes half of the sidewall and tread moulding portion of the mould.

A still further object of the invention is to provide a segmental tire mould which is exceptionally compact and is relatively inexpensive to manufacture, install and operate.

Another object of the invention is to provide a segment mounting arrangement which is particularly suitable for mounting the radially movable segments on a segmental tire mould of the type which includes opposed widewall mounding sections adapted for axial displacement relative to one another, a plurality of tread moulding segments in an annulus between said sidewall sections and resilient biasing means positioned radially inwardly of said segments and operative to urge said segments radially outwardly.

In accordance with the invention, there is provided a mould mechanism having a segment mounting arrangement which secures the segments to a support surface in such manner that the segments are resiliently biased away from the support surface so as to "float" in relation thereto unless the segments are pressed towards the support surface with a force greater than that biasing them away therefrom. This arrangement, coupled with any suitably controlled actuating means for moving the segments radially inward and outward as well as axially towards the segment support surface, enables operation of the mould mechanism with minimum sliding contact between the segments and the support surface during the radial inward and outward movement of the segments. That is, by controlling the force exerted on the segments towards the support surface in relation to the force biasing them away therefrom, the segments can be allowed to float in relation to the segment support surface until they are at or near their radially innermost or moulding positions.

More specifically, in its preferred form, the mould mechanism provided in accordance with the invention includes two opposed sidewall moulding sections axially relatively movable towards and away from each other; a plurality of tread moulding segments disposed between said sections, a bearing surface for said segments extending radially outwardly with respect to one of said sections; mounting means for said segments permitting radial movement of said segments between a radially innermost position in which said segments define with said sidewall sections a tire curing mould and a radially outermost position; said mounting means also permitting limited movement of said segments axially away from said bearing surface; resilient means for biasing said segments axially away from said bearing surface such that said segments are in full contact with said bearing surface only when said segments are pressed towards said bearing surface with a force in excess of the force of said resilient means; and means for effecting movement of said segments radially inwardly and outwardly as well as axially towards said bearing surface in co-ordination with the axial movement of said sidewall sections towards and away from each other.

In another preferred modification of the invention the segment mounting arrangement is adapted to permit, in addition to the limited axial movement just described, limited pivotal movement of the segments about axes substantially parallel to the axis of the sidewall moulding sections.

The segment mounting arrangement of the mould mechanism of the invention functions, firstly, to minimize sliding contact between the adjacent surfaces of the mould segments and the support surface on which they are mounted thereby preventing these surfaces from becoming worn from the repeated in-and-out movement of the segments in the operation of the mould. Secondly, it serves to eliminate any binding tendency during the inward and outward radial movement of the segments. More importantly, it facilitates the separation of the tread moulding face from the cured tire tread since there need not be simultaneous separation of the total tread face from the total tire tread surface with which it is in contact. One portion of the tread mould face can separate before another portion, thus providing a type of "peeling" action. This feature, in turn, permits the use of inexpensive, compact and efficient resilient biasing means for effecting radially outward movement of the segments rather than the elaborate levers, cams, gears and other bulky contrivances of prior art segmental mould mechanisms.

DESCRIPTION OF THE DRAWINGS

These and other features of the invention will become apparent from the following description of the parts, principles and elements thereof given herein by way of example, with reference to the accompanying drawings wherein like reference numbers refer to like parts throughout the several views and wherein.

DESCRIPTION OF THE PREFERRED EMBODIMENTS

Figure 1:
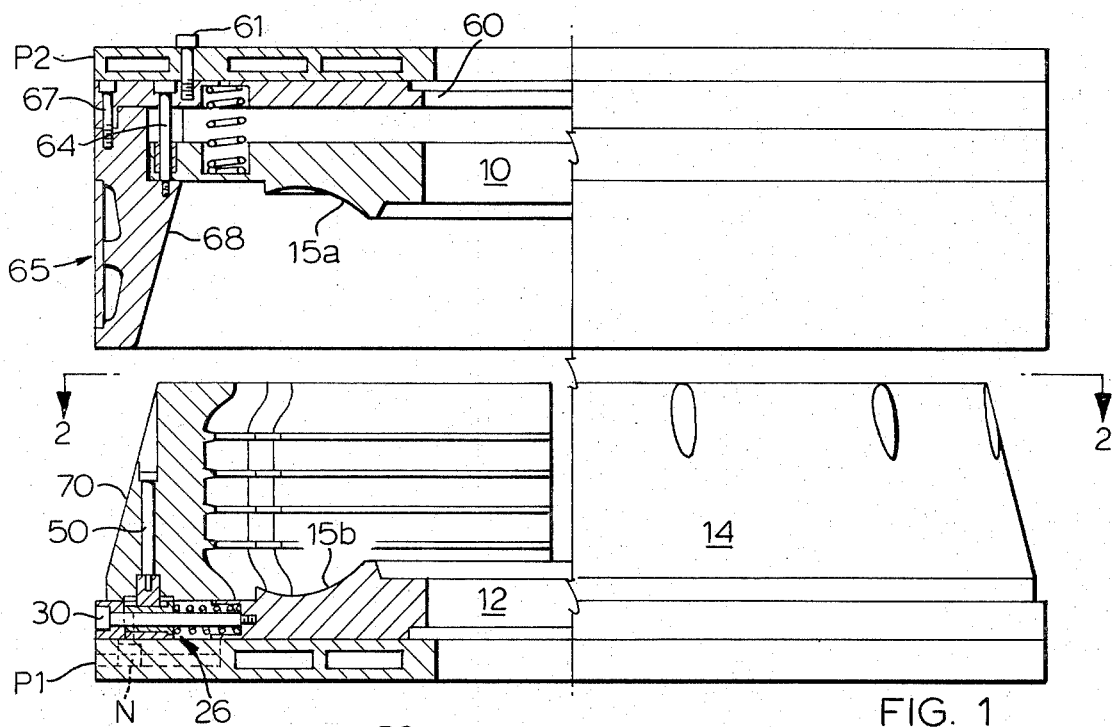
FIG. 1 is a side elevation view, partially in section of a segmental mould apparatus constructed in accordance with the invention.

Referring to the drawings, the illustrated segmental mould mechanism is essentially comprised of two opposed annular mould sections 10 and 12 and a plurality of tread mould segments 14 arranged in an annulus between the mould sections 10 and 12. In the embodiment shown, the mould segments 14 are shown as unitary structures with the tread pattern engraved directly therein. It will be appreciated, however, that segments 14 can equally well be adapted to carry separate, replaceable tread patterns. Such two-part segment construction has the advantage of permitting easy changing of tread patterns without disassembly of the entire mould. Also, of course, it permits use of a relatively soft metal, such as aluminum, for the tread pattern while the segment itself normally will be formed of a hard, high strength material such as ductile iron.

As will be known to those skilled in the art, the interior surfaces 15a, 15b of the two opposed sections 10–12 are utilized for moulding those surfaces of the tire which extend from the bead to the shoulder region thereof, whilst the mould segments 14 are utilized for moulding the tread region of the tire. Thus, in the radially innermost position of the tread moulding segments 14 and with the opposed mould sections 10–12 closed together to their maximum extent, the mould provides a continuous enclosure for moulding the exterior surface of a tire, whilst in the radially outermost position of the mould segments, they are located for total disengagement from the moulded tire facilitating its removal from the mould as will be further explained herein.

According to the invention, each tread moulding segment 14 is mounted between the mould sections 10 and 12 for radial movement relative thereto by a unique arrangement which minimizes sliding contact between the adjacent faces of the segments 14 and the segment support surface during the radial inward and outward movement of the segments. The mounting arrangement shown also permits pivotal movement of the mould segments 14 about axes substantially parallel to the axes of sections 10 and 12 during the radial inward and outward movement of the segments. This feature is not essential for the minimizing of sliding contact as hereinbefore noted but it does help prevent binding or jamming of the segments during inward and outward movement of the segments and, most importantly, it greatly facilites the separation of the tread pattern from the tire surface where, as in the embodiment of the invention illustrated, outward movement of the segments is effected by resilient biasing means, i.e., coil springs.

Figure 5:
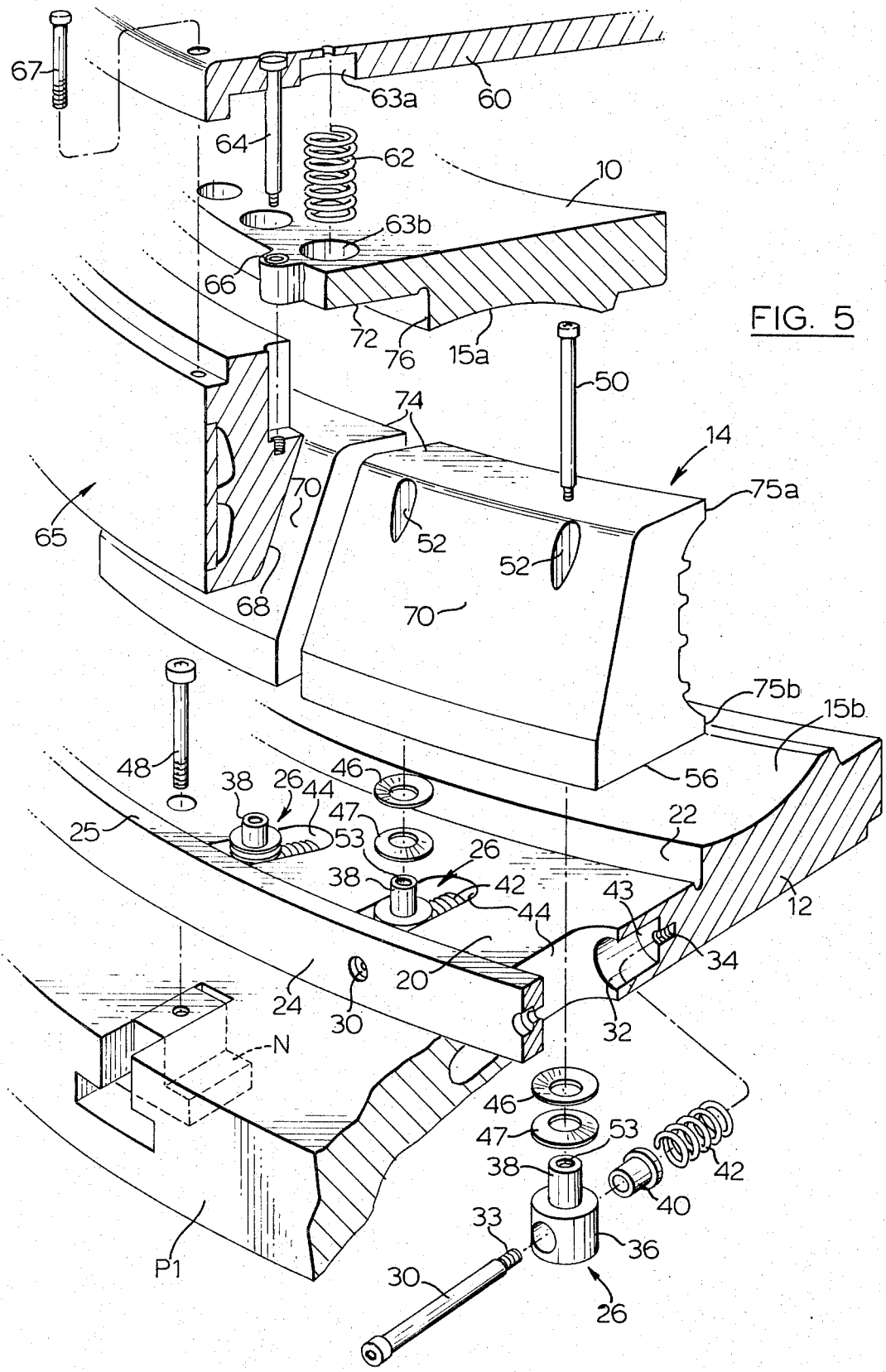
FIG. 5 is an exploded, partial perspective view showing details of the segment mounting means as well as details of the upper mould section carrier plate and associated segment actuating means.

More specifically, it will be seen from the drawings, and particularly from FIG. 5, that the lower mould section 12 is provided with an annular extension radially outwardly of the actual mould surface 15b, said extension being in the form of a flat annular bearing surface 20 extending radially inwardly from the outer periphery of the mould section 12 and terminating at a shoulder 22 defining the radially inner limit of the bearing surface 20. A stop ring 24, having an upper surface 25 flush with surface 20, circumscribes the radially outer periphery of bearing surface 20.

Spaced circumferentially around bearing surface 20 is a plurality of segment mounting elements indicated generally by the numeral 26. In the embodiment shown, two mounting elements 26 are provided for each segment 14. Each element 26 consists of a rod 30 positioned within a bore hole 32 extending inwardly from the periphery of bearing surface 20 along a line which is substantially parallel to both the bearing surface 20 and the radius R (FIG. 2) which bisects the segment 14 which the particular element 26 supports. Rod 30 is centrally secured in bore 32 by means of threaded end 33 and corresponding tapped hole 34 in section 12.

Circumscribing rod 30 is a bearing block 36 having an integral, internally threaded extension 38 and being adapted to receive a bearing 40 which permits low friction sliding movement and limited pivotal movement of block 36 on rod 30. Also circumscribing rod 30 is a coil compression spring 42 which is positioned between bearing element 40 and the end wall 43 of bore 32.

A plurality of slots 44 is formed in bearing surface 20 to accommodate bearing blocks 36 and permit limited reciprocal movement thereof on rods 30. The radially outer limit of movement of bearing blocks 36 in slots 44 is defined by the radially inner surface of stop ring 24. Optionally, springs (not shown) may be disposed around rod 30 between the radially inner face of stop ring 24 and the radially outer face of block 36 to form a resilient abutment which serves to cushion the shock from the opening force of compression springs 42. Extensions 38 project above the bearing surface 20 and carry, back to back, a pair of disc springs 46, 47. Disc springs 46, 47 are formed of resilient spring steel so that they may be flattened under compression and then resume their dished configuration when not under compression.

Segments 14 are attached to extensions 38 by means of shoulder screws 50 which extend through axially extending openings 52 formed in segments 14 and are threaded into corresponding tapped holes 53 formed in the extensions 38. The openings 52 through segments 14 are provided with enlarged portions 54 and bushings 55 (see FIGS. 3 and 4) adapted to slidably receive extensions 38. Also, the length of the attaching shoulder screws 50 and the depth of the enlarged portions 54 of bores 52 are selected to permit limited axial movement of segments 14 away from surface 20 under biasing effect of disc washers 46, 47. Thus, under a compressive (or downward force, as viewed on the drawings), the faces 56 of segments 14 will fully contact the surface 20 but otherwise they will be separated therefrom a small distance under the biasing influence of disc springs 46, 47. For the embodiment of the invention shown, a separation distance of five to ten thousandths of an inch has been found to be sufficient for minimizing sliding contact between the segments and the bearing surface. It will be appreciated, however, that for other embodiments, a greater or lesser separation distance may be preferred depending on design details and operating conditions.

Mould section 12 with associated segment bearing surface 20 and segment mounting elements 26 is secured to the lower press platen $P_1$ (FIGS. 1 and 5) of a conventional tire curing press (not shown). In the embodiment shown, this is done by means of a plurality of equispaced screws 48 extending through bearing surface 20 into "T" nuts N positioned in platen $R_1$.

The movable mould section 10 is carried upon a carrier plate 60 and spaced therefrom under the action of a plurality of coil compression springs 62. Such an arrangement ensures alignment of the mould sections 10 and 12 as well as accurate setting of the tire beads upon the bead seats of the respective mould sections 10–12 as will be apparent from the following description. In such an arrangement, the carrier plate 60 is fixedly secured to the upper press half in place of the upper mould section normally used in the press by bolts 61 which extend through press platen $P_2$ (FIG. 1) and are threaded into carrier plate 60. The upper mould section 10 thus is carried by and with the press half during its opening and closing movement. The mounting for the upper mould section 10 upon the carrier plate 60 comprises a plurality of circumferentially spaced guide shafts 64 extending through plate 60 and through corresponding openings in the upper mould section 10. Bushings 66 around shafts 64 permit low friction, axial sliding movement of section 10 relative to plate 60 upon respective said guide shafts 64. Coil compression springs 62 are located to act between the carrier plate 60 and the upper mould section 10. The springs 62 have their outer ends contained by circular recesses 63a, 63b formed in the opposed faces of the plate 60 and mould 10 respectively and are compressible to permit the carrier plate 60 to move into full contact with the mould section 10 when sufficient axial force is applied to the carrier plate to overcome the biasing force of compression springs 62. Preferably, the compression springs 62 are pre-loaded such that a certain predetermined minimum compressive force must be applied before the biasing effect of the springs 62 is overcome and the plate 60 and section 10 will move towards each other. This pre-loading condition serves a number of useful purposes as will be explained hereinafter with reference to the operation of the mould mechanism of the invention.

A skirt 65 is attached to the plate 60 by the guide shafts 64 and bolts 67 so as to be axially movable a limited distance by and with the plate 60 independent of the mould section 10. The skirt 65 is formed with a radially outwardly tapering frusto-conical surface 68 adapted for engagement with the inwardly tapering frusto-conical surfaces 70 of segments 14.

Thus, axial closing movement of the carrier plate 60 and attached upper mould section 10 towards the lower mould section 12 will cause the radially inner surface 68 of skirt 65 to be brought into contact with the radially outer surfaces 70 of the segments 14 which, in their initial positions, are located at their radially outermost positions under the biasing influence of the coil springs 42. Further closing movement of the plate 60 towards the stationary mould section 12 will cause the skirt surface 58 and the outer surfaces 70 of the segments 14 to cooperate with a camming action forcing the segments radially inwardly relative to the mould sections against the action of the compression springs 42 until, in a fully closed position (FIG. 4), the axially inner surface 72 of mould section 10 is in contact with the top surface 74 of segments 14, the opposed faces of plate 60 and mould section 10 are in contact and the segments are in their radially innermost positions with their radially inner ends 75a and 75b abutting against the shoulder 22 on section 12 and shoulder 76 on section 10.

Conversely, opening movement of the plate 60 with attached mould section 10 permits the tread moulding segments 14 to move radially outwardly under the biasing influence of the compression springs 42 as skirt 65 retreats axially away from the stationary mould section 12 until such time as the segments 14 have reached their radially outermost positions with bearing blocks 36 abutting against the inner side of ring 24 or, preferably, against resilient cushioning means such as disc springs interposed between the inner side of ring 24 and blocks 36.

The segmental mould mechanism thus described is of extremely simple and economical manufacture and is extremely compact since the actuating means for both radially inward and outward movement of the tread moulding segments is contained essentially within the peripheral confines of the upper and lower mould sections 10–12. Such a compact design enables it to be readily installed within a standard size conventional moulding press without modification thereto, such as the well-known Bag-O-Matic ("Bag-O-Matic" is a trade mark of The McNeil Machine and Engineering Company, Akron, Ohio, U.S.A.) press, which is generally used for the moulding and curing of cross-ply tires.

The conventional mould halves may be easily removed from such a Bag-O-Matic press and the subject segmental mould readily installed in their place, whereby such press is adapted for the moulding of radial-ply tires, as will be explained herein.

Figure 2:
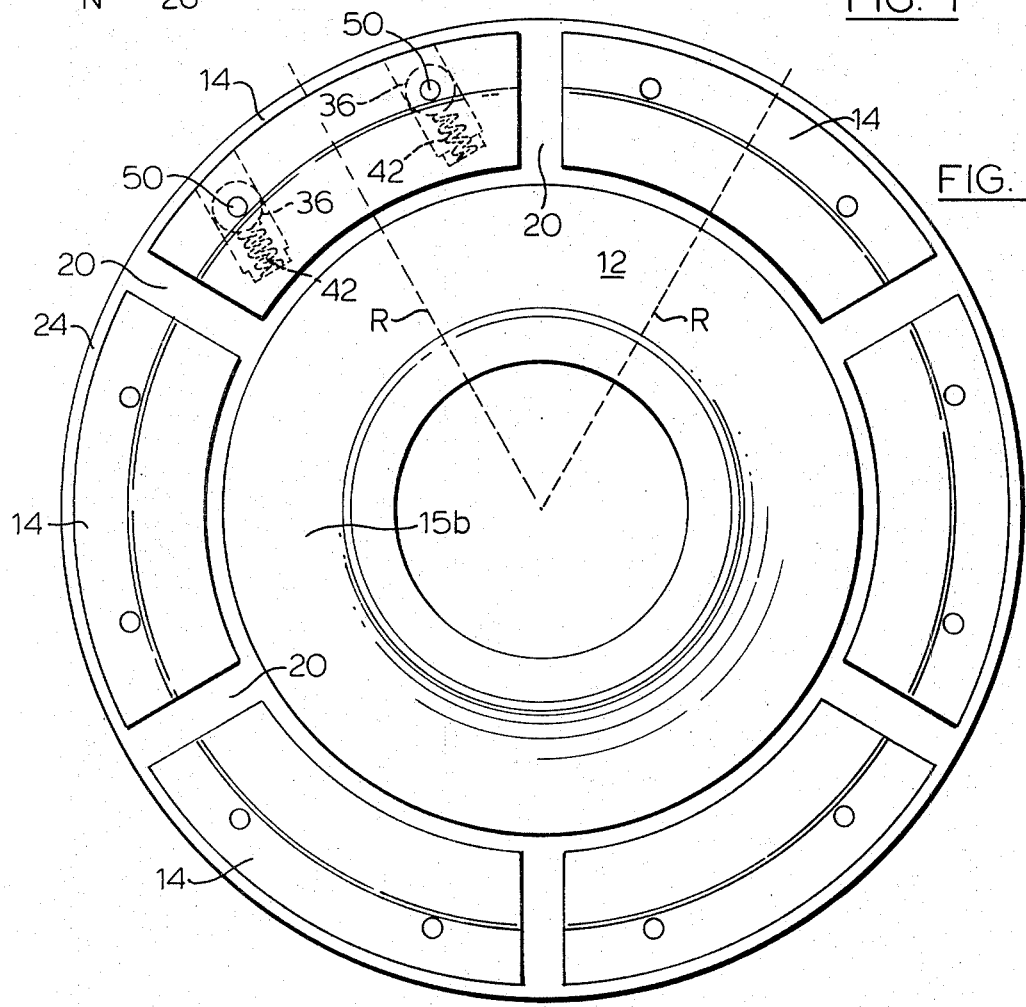
FIG. 2 is a top plan view along the line 2—2 of FIG. 1.
Figure 3:
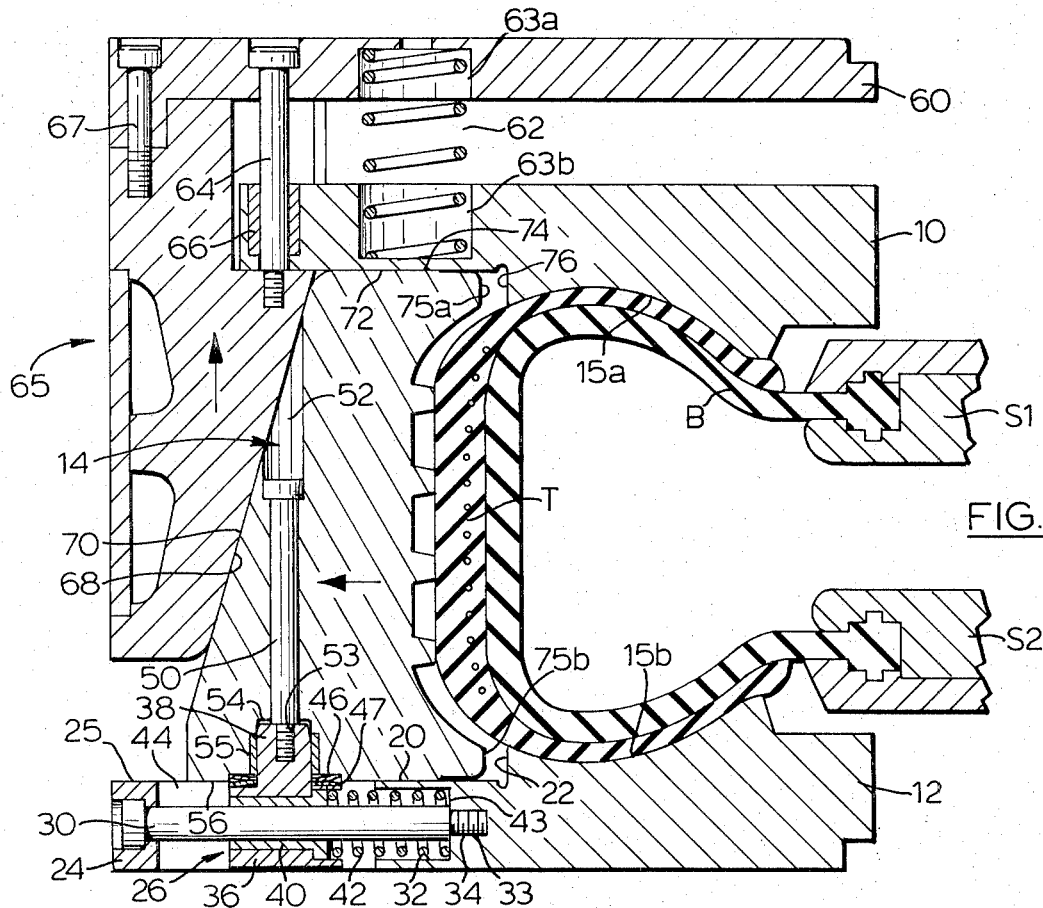
FIGS. 3 and 4 are cross-sectional views of one side of the mould of FIG. 1 showing two stages in the operating cycle of the mould apparatus.
Figure 4:
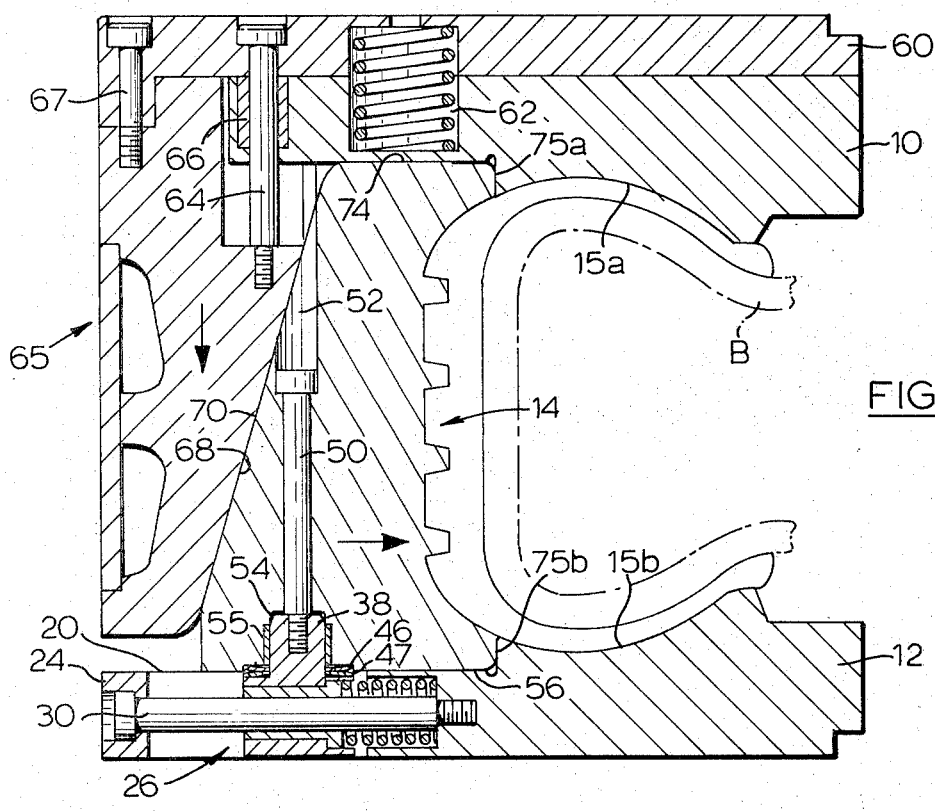

As is known, radial-ply tires are brought to the final moulding and curing stage in partially-shaped form rather than in the cylindrical form in which cross-ply tires are generally inserted into the curing press. FIGS. 3 and 4 illustrate the operation of a press within the subject mould mechanism is installed and wherein part of the conventional press structure, namely the curing bag B and the upper and lower seating rings $S_1$, $S_2$ are shown in somewhat diagrammatic form. As a first step, the partially shaped tire T is moved axially into the mould and positioned upon the lower stationary mould section 12, the curing bag rings $S_1$, $S_2$ are brought together and the curing bag B is inflated to the initial shaping pressure. Closing movement of the press halves is then initiated whereby the upper sidewall region of the tire T is contacted by the movable mould section 10. At the same time, the tread moulding segments 14 are moved radially inwardly towards the tread region of the tire but not sufficiently to contact the tire. The compression springs 62 are pre-loaded at least sufficiently to overcome the initial shaping pressure of bladder B so that the mould sections 10-12 are brought substantially into their final spaced relation axially with respect to one another thereby setting the tire beads (as shown in FIG. 3) before the tread moulding segments 14 have completed their radially inward movement. As mentioned hereinbefore, the frusto-conical surface 68 of skirt 65, which actuates the segments 14, is carried by the carrier plate 60 so that further continued axial movement of the carrier towards the lower stationary mould section 12 will cause further radially inward movement of the mould segments 14 towards the tread region of the tire whilst, at the same time, the compression springs 62 acting between the upper mould section 10 and the carrier plate 60 are compressed. Sliding contact between bearing surface 20 and the adjacent faces 56 of the segments is prevented or at least minimized by the strong biasing action of disc springs 46, 47 which, because of the segments' capacity to move axially away from the bearing surface 20 a limited distance, prevents full contact between these surfaces until the segments are pressed towards bearing surface 20 with sufficient force to overcome the biasing effect of the disc springs 46, 47. Thus, by carefully correlating the pre-loading pressure of springs 62 on plate 60 with the biasing force of disc springs 46, 47 on segments 14, full contact between surfaces 20 and 54 can be prevented until the segments actually contact the tread region of the green tire. Therefore, full sliding contact between bearing surface 20 and segment surfaces 54 occurs only for a very small part of the segment's total inward travel. The fully closed condition of the press is shown in FIG. 2 wherein the carrier plate 60 is in its final abutting position against the axially outer surface of the upper mould section 10, the segments 14 are in their radially innermost positions, and the disc springs 46, 47 are fully compressed allowing full contact between surfaces 20 and 56.

Upon completion of the curing operation, the press is opened allowing resilient disc springs 46, 47 to again separate surfaces 20 and 56 and also allowing springs 42 to push the segments 14 radially outwardly to their radially outermost positions. There is considerable adhesive force between the tread of the cured tire and the mould face. In the present mould mechanism, sticking of the segments in their innermost positions as a result of this adhesion is avoided by the combination of the axial biasing affect of disc springs 46, 47 as just described and the limited axial pivotability of the segments 14. In the embodiment illustrated, the segments 14 may pivot a limited degree about the axially extending extensions 38 and attaching bolts 50. Thus, during the inward or outward radial movement of the segments 14, it is possible for one segment mounting element to get slightly radially ahead or behind the other. It follows from this that one end of a tread moulding segment can separate from the cured tire tread independently of the other end, thereby providing a "peeling" action which facilitates separation of the tread moulding pattern from the cured tire. This peeling effect can be enhanced by utilizing, for each segment mounting, a pair of springs 42 with different biasing strengths thereby giving a positive peeling action to the segments 14.

In addition to facilitating the separation of the tread moulding segments 14 from the cured tire tread, the floating and pivotal segment mounting arrangement herein described serves to eliminate or at least greatly minimize jamming or binding of the segments during their inward travel. This is particularly so when inward movement of the segments is effected by an axially movable tapered skirt means such as that described herein. However, while the mould mechanism of the invention is particularly adapted for use with such actuating means, it is to be understood that other actuating arrangements may also be utilized without departing from the spirit and intent of the invention. For example, separate hydraulic actuators, such as are known in the art, may be employed for effecting radial movement of the segments and axial movement of the sidewall moulding sections.

What I claim as new and desire to protect by Letters Patent of the United States is:

1. Apparatus for curing a pneumatic tire comprising two opposed sidewall moulding sections axially relatively movable towards and away from each other; a plurality of tread moulding segments disposed between said sections; a bearing surface for said segments extending radially outwardly with respect to one of said sections; means mounting said segments on said bearing surface permitting radial movement of said segments between a radially outermost position and a radially innermost position in which said segments define with said sidewall sections a tire curing mould; said mounting means also permitting limited movement of said segments axially away from said bearing surface; resilient means for biasing said segments axially away from said bearing surface such that said segments are in full contact with said bearing surface only when said segments are pressed towards said bearing surface with a force in excess of the force of said resilient means; and means for effecting movement of said segments radially inwardly and outwardly as well as axially towards said bearing surface in co-ordination with the axial movement of said sidewall sections towards and away from each other.

2. Apparatus of claim 1 wherein said mounting means for said segments is adapted to permit limited pivotal movement of said segments about axes substantially parallel to the axis of said one mould section.

3. Apparatus of claim 1 wherein said resilient means comprises a plurality of springs interposed between said bearing surface and the adjacent faces of said segments.

4. Apparatus as claimed in claim 1 wherein said means for effecting radial inward and outward movement of said segments includes a plurality of compressible springs operative to maintain said segments under constant radially outward bias and an annular skirt having a frusto-conical radially inner surface co-operable with a corresponding radially outer surface on each said segments to move said segments inwardly against the baising effect of said springs upon axial movement of said skirt towards said segments.

5. An apparatus for curing a pneumatic tire comprising two opposed sidewall moulding sections; a plurality of tread moulding segments disposed between said sections for independent radial movement with respect thereto; a segment bearing surface extending radially outwardly from one of said sections; means mounting said segments on said bearing surface and permitting limited axial movement of said segments away from said surface; first resilient means disposed between said segments and said bearing surface for biasing said segments axially away from said bearing surface so that said segments are not in full contact with said bearing surface unless axial pressure in excess of the biasing force of said first resilient means is applied to said segments; second resilient means disposed radially inwardly of said segments and biasing said segments radially outwardly with respect to said one mould section and means for moving said segments radially inwardly against the bias of said second resilient means during movement of said mould sections towards one another, said means for radially inwardly moving said segments during movement of said mould sections towards one another also permitting radially outward movement of said segments under the influence of said second resilient means during movement of said mould sections away from one another.

6. Apparatus as claimed in claim 5 wherein said segment mounting means also is arranged to permit limited pivotal movement of said segments about axes substantially parallel to the axes of said mould sections.

7. Apparatus as claimed in claim 6 wherein said means mounting said segments comprises, for each segment, a pair of rods extending inwardly from the outer periphery of said bearing surface substantially parallel to and on each side of a radius of said one of said sections, a bearing element slidably mounted, on each said rod for limited pivotal movement thereabout, means attaching each said mould segment to said elements and permitting limited movement of said segments away from said bearing surface.

8. Apparatus as claimed in claim 7 wherein said first resilient means comprises a plurality of compressible disc springs disposed about said segment attaching means and acting as aforesaid directly upon the adjacent faces of said segments and said bearing elements.

9. Apparatus as claimed in claim 8 wherein said second resilient means comprises a plurality of compressible coil springs disposed about each of said rods and acting on said bearing elements to bias them outwardly.

10. Apparatus as claimed in claim 5 wherein said means for moving said segments radially inwardly comprises an axially movable annular skirt having a frusto-conical radially inner surface co-operable with a corresponding radially outer surface on each said segment.

11. Apparatus as claimed in claim 5 further including a carrier plate for the other said mould section; means securing said other mould section to said carrier plate permitting limited axial movement relative thereto and resiliently compressible means biasing said other mould section axially away from said carrier plate.

12. Apparatus as claimed in claim 11 wherein said means securing said other mould section to said carrier plate comprises a plurality of axially extending shafts circumferentially spaced around said carrier plate and a plurality of corresponding bearings on said other mould section for slidably receiving said shafts.

13. Apparatus as claimed in claim 11 wherein said means for moving said segments radially inwardly comprises an annular skirt on said carrier plate having a frusto-conical radially inner surface co-operable with a corresponding radially outer surface on each said segment.

14. Apparatus as claimed in claim 13 wherein said co-operating means comprises an annular skirt on said carrier plate having a frusto-conical radially inner surface co-operable with a corresponding radially outer surface on each said segment.

15. Apparatus as claimed in claim 14 wherein said first resilient means is pre-loaded to provide a constant predetermined biasing force between said carrier plate and said first mould section.

16. Apparatus according to claim 15 wherein said second resilient means exerts sufficient force on said segments to counterbalance the axial pressure imposed on the segments by said frusto-conical skirt surface until said segments have been moved the major portion of the distance from their radially outermost positions to their radially innermost positions.

17. A segmental tire moulding apparatus for use in a conventional tire curing press of the type which normally utilizes upper and lower mould halves, each of which includes half of the sidewall and tread moulding sections of the mould comprising: a carrier plate for attachment to said curing press in place of said upper mould half; a first annular mould section having a portion for moulding one bead and sidewall region of a tire; mounting means for securing said first mould section to said carrier plate permitting limited axial movement relative thereto; first resilient means biasing said first annular mould section axially away from said carrier plate; a second annular mould section having a portion for moulding the other bead and sidewall region of a tire and having means for attachment to said curing press in place of said lower mould half; a segment support surface formed around the axially inner side of said second mould half extending radially outwardly from the sidewall moulding portion thereof; a plurality of moulding segments positioned between said first and second annular mould sections; radially movable bearing elements contained within the confines of said support surface; attachment means for securing said segments to said bearing elements and permitting limited axial movement of said segments away from said support surface; second resilient means biasing said segments axially away from said support surface; third resilient means biasing said bearing elements towards the outer periphery of said support surface; stop means limiting the extent of radially outward movement of said bearing elements and co-operating means on said carrier plate operative to move said segments radially inwardly against the bias of said third resilient means during movement of said mould sections towards one another, said co-operating means permitting radially outward movement of said segments under the influence of said third resilient means during movement of said mould sections away from one another.

* * * * *